US008712068B2

(12) United States Patent
Christoph (10) Patent No.: US 8,712,068 B2
(45) Date of Patent: Apr. 29, 2014

(54) ACOUSTIC ECHO CANCELLATION

(75) Inventor: Markus Christoph, Straubing (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 1022 days.

(21) Appl. No.: 12/710,092

(22) Filed: Feb. 22, 2010

(65) Prior Publication Data

US 2010/0215185 A1   Aug. 26, 2010

(30) Foreign Application Priority Data

Feb. 20, 2009   (EP) .................................. 09 153 339

(51) Int. Cl.
*H04B 3/20*   (2006.01)
*H04M 9/08*   (2006.01)

(52) U.S. Cl.
USPC ...................... 381/66; 379/406.1; 379/406.12

(58) Field of Classification Search
USPC ............... 381/71.1–71.14, 94.1–94.9, 86, 66; 379/3, 406.01–406.16; 370/286, 289
See application file for complete search history.

(56) References Cited

U.S. PATENT DOCUMENTS

| | | | |
|---|---|---|---|
| 6,091,813 A | | 7/2000 | Harley et al. |
| 6,842,516 B1 | * | 1/2005 | Armbruster .............. 379/390.02 |
| 2006/0025994 A1 | * | 2/2006 | Christoph .................... 704/229 |

OTHER PUBLICATIONS

Chan et al., "Lattice PFBLMS: Fast Converging Structure for Efficient Implementation of Frequency-Domain Adaptive Filters," Signal Processing, Elsevier Science Publishers B.V. Amsterdam, NL, pp. 79-89, Oct. 1999.
Kheong et al., "Using a Lattice Decorrelator in the Partitioned FBLMS Algorithm" Information, Communications and Signal Processing, Proceedings of 1997 International Conference on Singapore , 1997, pp. 1208-1212.

* cited by examiner

*Primary Examiner* — Xu Mei
(74) *Attorney, Agent, or Firm* — O'Shea Getz P.C.

(57) ABSTRACT

An input signal is supplied to a loudspeaker-room-microphone system having a transfer function and that provides an output signal. An adaptive filter unit models the transfer function of the loudspeaker-room-microphone system and provides an approximated output signal, where the output signal and the approximated output signal are subtracted from each other to provide an error signal. The modeling of the transfer function of the loudspeaker-room-microphone system in the adaptive filter comprises transforming the input signal and the error signal from the time domain into the spectral domain; delaying of the input signal in the frequency domain to generate multiple differently delayed input signals in the frequency domain; adaptive filtering of each one of the multiple differently delayed input signals in the frequency domain according to the error signal in the spectral domain; summing up of the filtered differently delayed input signals in the frequency domain to generate the approximated output signal in the frequency domain; and transforming the approximated output signal from the spectral domain into the time domain.

10 Claims, 9 Drawing Sheets

ACOUSTIC ECHO CANCELLATION

CLAIM OF PRIORITY

This patent application claims priority from European Patent Application No. 09 153 339.8 filed on Feb. 20, 2009, which is hereby incorporated by reference in its entirety.

FIELD OF TECHNOLOGY

The invention relates to audio signal processing, and in particular to echo compensation of a signal in the spectral domain.

RELATED ART

Methods for suppressing, eliminating, or compensating for echo or reverberation effects while simultaneously transmitting and receiving acoustic signals, for example, sound including music, speech, etc., are in general referred to as acoustic echo cancellation (AEC). For example, during a call on hands-free telephones, the voice of a caller reaches from the loudspeaker to the microphone at a remote subscriber and is transmitted back to the caller who experiences echoes of his own voice while speaking. An echo cancellation system is employed to reduce such undesired effects.

Echo cancellation techniques often use adaptive filters that are adjusted by an adaptation algorithm. In such filters, the acoustic characteristics of a listening environment, e.g., echoes generated by or in a listening room, are modeled. The more accurate the model, the better the cancellation of undesired echoes. To achieve an optimum cancellation behavior, the adaptation step size of the filter has to be dynamically adapted to the current level ratios of the ambient signal and the remote speech signal as well as to the already achieved echo attenuation. However, such regulation of the adaptation step size is difficult to realize and costly.

There is a need for improved echo cancellation of a signal involving an adaptive filter in the spectral domain, where the adaptation speed and the quality of the echo cancellation, in particular in response to a sudden change of the acoustic environment conditions are improved.

SUMMARY OF THE INVENTION

An input signal is supplied to a loudspeaker-room-microphone system having a transfer function and providing an output signal, and to an adaptive filter unit modeling the transfer function of the loudspeaker-room-microphone system and providing an approximated output signal. The output signal and the approximated output signal are subtracted from each other to provide an error signal. The modeling of the transfer function of the loudspeaker-room-microphone system in the adaptive filter comprises transforming the input signal and the error signal from the time domain into the spectral domain; delaying of the input signal in the frequency domain to generate multiple differently delayed input signals in the frequency domain; adaptive filtering of each one of the multiple differently delayed input signals in the frequency domain according to the error signal in the spectral domain; summing the filtered differently delayed input signals in the frequency domain to generate the approximated output signal in the frequency domain; and transforming the approximated output signal from the spectral domain into the time domain.

These and other objects, features and advantages of the present invention will become more apparent in light of the following detailed description of preferred embodiments thereof, as illustrated in the accompanying drawings.

BRIEF DESCRIPTION OF THE DRAWINGS

The invention can be better understood with reference to the following drawings and description. Moreover, in the figures, like reference numerals designate corresponding parts. In the drawings.

DETAILED DESCRIPTION

Acoustic echo cancellation can be attained, e.g., by subtracting an estimated echo signal from the total sound signal. To provide an estimate of the actual echo signal, algorithms have been developed that operate in the time domain and that may employ adaptive digital filters processing time-discrete signals. Such adaptive digital filters operate in such a way that the network parameters defining the transmission characteristics of the filter are optimized with reference to a preset quality function. Such a quality function is realized, for example, by minimizing the average square errors of the output signal of the adaptive network with reference to a reference signal.

The term "noise" in the instant case includes sound acting from the outside, such as ambient noise, for example, or driving noise perceived in the passenger cabin of a motor vehicle, as well as acoustic waves, which are triggered by mechanical vibrations of the passenger compartment, for example, or the engine of the motor vehicle. If these noises are undesired, they are also referred to as interfering noises. Typical background noises can be caused by the tires, the fan and other aggregates in the motor vehicle and can thus be a function of the speed, the road conditions and the respective operating state of the motor vehicle. When speech or music is offered in a noise-filled environment such as the interior of a motor vehicle, for example, by way of an electro-acoustic device (audio device), the noise present in the interior can have an undesired interfering effect on a desired speech communication or music presentation.

To an increasing extent, modern motor vehicles include entertainment systems including a plurality of high-quality loudspeakers arranged in the interior of the vehicle. In addition, to improve the speech communication in the passenger compartment of a motor vehicle, interior communication systems may be used that comprise microphones each assigned to a seat in the passenger compartment. These microphones capture the speech signal of the respective speakers and the corresponding speech signals are presented by the loudspeakers of an entertainment system arranged in the vehicle interior. The microphones may be arranged in the roof lining of the vehicle in such a manner that on average the smallest possible space between the microphone and the respective speaker appears.

However, even with a good position selection of the microphones, the space between the mouth of the speaker and the microphone is slightly less than half a meter. This can lead to undesirable feedback loops and, accordingly, to unwanted echoes. If, for example, a speech signal is received by the driver of the motor vehicle and is emitted for the passengers in the rear of the compartment via the loudspeakers so as to increase the speech comprehensibility of the driver, this speech signal again reaches the microphone assigned to the driver position and thus causes a further, time-delayed and weakened, but yet highly interfering replay of the same speech content, i.e., an echo.

The use of adaptive filters allows for a sufficiently accurate approximation of a searched impulse response and, accordingly, the transfer function of an unknown system. This process is also referred to as an estimation of the transfer function of an unknown system. Adaptive filters are understood to be digital filters that adapt their filter coefficients according to a given algorithm to an input signal. An unknown system is assumed to be a linear, distorted system, the transfer function of which is searched. In order to evaluate this transfer function, an adaptive system is operated in parallel to the unknown system.

Figure 1:
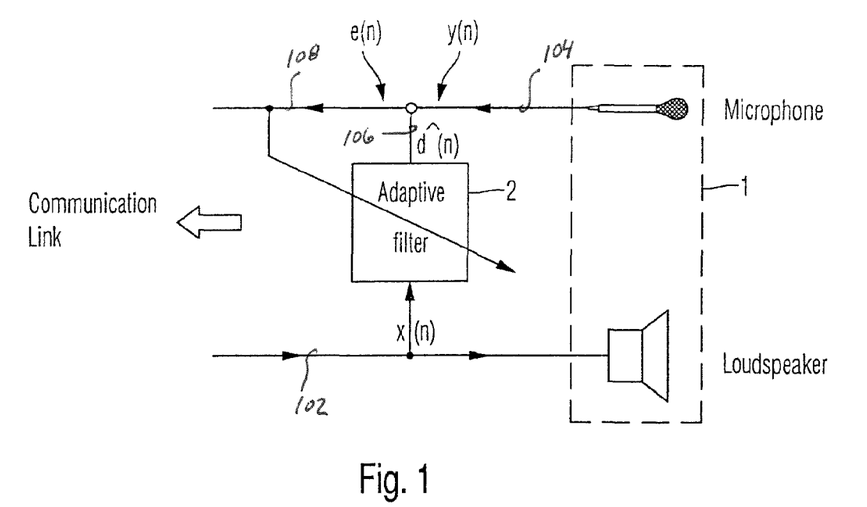
FIG. 1 is a block diagram illustration of a basic adaptive filter.

FIG. 1 illustrates an unknown system 1 and an adaptive filter 2 operated in parallel. The unknown system and its unknown transfer function may be established by the passenger compartment of a motor vehicle or may only represent vibrations traveling in a solid body. According to FIG. 1, an input signal x(n) on a line 102 is converted into a signal y(n) on a line 104 by the unknown system 1 and into a signal d^(n) on a line 106 by the adaptive filter 2.

The signal y(n) which is the signal x(n) distorted by the unknown system having the unknown transfer function serves as a reference signal. The output d^(n) of the adaptive filter is deducted from the signal x(n) to provide an error signal e(n) on a line 108. Employing, e.g., the known Least Mean Square(LMS) method, the filter coefficients if the adaptive filter 2 are adjusted in an iteration loop such that the error signal e(n) on the line 108 is minimized, i.e., d^(n) approaches y(n). The unknown transfer function is thus approximated and, in terms of cancellation, maximum elimination of the signal y(n) can be attained by the signal d^(n).

The LMS algorithm may be based on the so-called method of the steepest descent (gradient descent method) and approximates the gradient in a simple manner. The algorithm operates in a time-recursive manner, that is, the algorithm is run through over and over with each new data set and the solution is updated. Due to its relatively small complexity, its numerical stability, and the low memory requirement, the LMS algorithm is often used for adaptive filters and for adaptive controls. Alternatively the adaptation method may employ for example recursive least squares, QR decomposition least squares, least squares lattice, QR decomposition lattice or gradient adaptive lattice, zero forcing, stochastic gradient algorithms and so forth.

Infinite Impulse Response (IIR) filters or Finite Impulse Response (FIR) filters may be used as adaptive filters in connection with the above adaptation algorithms. FIR filters have a finite impulse response and operate in discrete time steps, which may be determined by the sampling frequency of an analog signal. An FIR filter of n-th order can be described by the equation $$d^{\wedge}(n) = b_0 \cdot x(n) + b_1 \cdot x(n-1) +$$
$$b_2 \cdot x(n-2) + \ldots + b_N \cdot x(n-N)$$
$$= \sum_{i=0}^{N} b_i \cdot x[n-i]$$

wherein d^(n) is the output value at a discrete point in time n and is computed from the sum of the N last sampled input values from x(n−N) to x(n) weighted with filter coefficients $b_i$. The respective transfer function is determined by these filter coefficients $b_i$.

Contrary to FIR filters, IIR filters include already computed output values in the computation to the effect that they have an infinite impulse response. However, due to the fact that for an input pulse the computed values are very small after a finite time, the computation can in practice be terminated after a finite number of samples based according to the following equation:

$$d^{\wedge}(n) = \sum_{i=0}^{N} b_i \cdot x(n-1) - \sum_{i=0}^{M} a_i \cdot d^{\wedge}y(n-i)$$

In this equation, d^(n) is the output value at a point in time n and is computed from the sum of the samples of the input signal x(n) weighted with the filter coefficients $b_i$, added to the sum of the output values d^(n) weighted with the filter coefficients $a_i$. The desired transfer function can be adapted by controlling the filter coefficients $a_i$ and $b_i$. Contrary to FIR filters, IIR filters can be unstable, but also have a higher selectivity with less expenditure. In practice, the filter, which best complies with the required specifications in consideration of the requirements and of the computational effort supplied therewith is chosen in each case.

Figure 2:
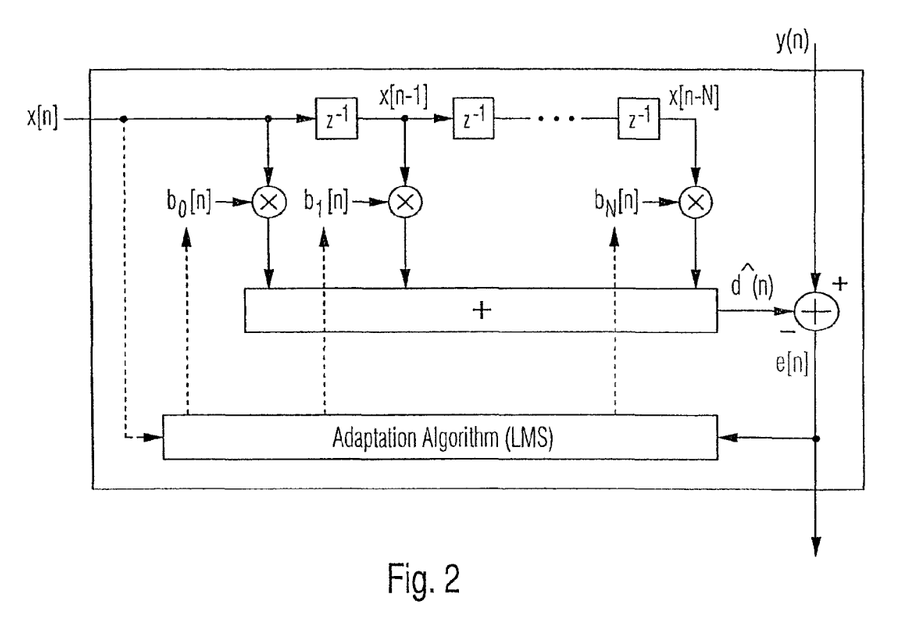
FIG. 2 is a block diagram illustration of the signal flow of an adaptive filter using a Least Mean Square (LMS) algorithm.

FIG. 2 is a block diagram illustration of a typical LMS computation for the iterative adaptation of an exemplary FIR filter. A first input signal x[n] is chosen as the reference signal for the adaptive LMS algorithm and the signal y[n] is taken as a second input signal, which, as discussed with reference to FIG. 1, is derived from the input signal x[n] by filtering with the transfer function of the unknown system. As already mentioned above, these input signals may be acoustic signals that are converted into electric signals. Likewise, however, these input signals may be or include electric signals that are generated by sensors for accommodating mechanical vibrations or also by revolution counters.

FIG. 2 also shows a FIR filter of N-th order with which the input signal x[n] is converted into the signal d^[n] over discrete time n. The N coefficients of the filter are identified with $b_0[n]$, $b_1[n]$ ... $b_N[n]$. The adaptation algorithm iteratively changes the filter coefficients $b_0[n]$, $b_1[n]$ ... $b_N[n]$ until an error signal e[n] which is the difference signal between the signal y[n] and the filtered input signal d^[n] is minimal. The signal y[n] is the input signal x[n] distorted by the unknown system.

Generally, both of the signals x[n] and y[n] input into the adaptive filter are stochastic signals. In case of an acoustic AEC system, they are noisy measuring signals, audio signals or communications signals, for example. The output of the error signal e[n] and the mean error square, the so-called mean squared error (MSE), is thus often used as quality criterion for the adaptation, where:

$$MSE = E\{e^2[n]\}.$$

The quality criterion expressed by the MSE can be minimized by a recursive algorithm, such as the known least mean square (LMS) algorithm. With the least mean square method, the function to be minimized is the square of the error. That is, to determine an improved approximation for the minimum of the error square, only the error itself, multiplied with a constant, must be added to the last previously-determined approximation. The adaptive FIR filter must thereby be chosen to be at least as long as the relevant portion of the unknown impulse response of the unknown system to be approached, so that the adaptive filter has sufficient degrees of freedom to actually minimize the error signal.

The filter coefficients are gradually changed in the direction of the greatest decrease of the error margin MSE and in the direction of the negative gradient of the error margin MSE, respectively, wherein the parameter µ controls the step size. The known LMS algorithm for computing the filter coefficients $b_k[n]$ of an adaptive filter used in the further course in an exemplary manner, can be described as follows:

$$b_k[n+1] = b_k[n] + 2 \cdot \mu \cdot e[n] \cdot x[n-k] \text{ for } k=0, \ldots N-1.$$

The new filter coefficients $b_k[n+1]$ correspond to previous filter coefficients $b_k[n]$ plus a correction term, which is a function of the error signal e[n] and of the last N input signal samples x[n−k] (k=0 . . . N−1), which is assigned to the respective filter coefficient $b_k$. The LMS convergence parameter µ thereby represents a measure for the speed and for the stability of the adaptation of the filter.

It is furthermore known that the adaptive filter, in the instant example a FIR filter, converges to a known and so-called Wiener filter in response to the use of the LMS algorithm, when the following condition applies for the amplification factor µ:

$$0 < \mu < \mu_{max} = 1/\lambda$$

wherein N represents the order of the FIR filter and λ represents the eigenvalue of x[m−k], k=0 . . . N−1. In practice, the used step size and the convergence parameter µ, respectively, is often chosen to be $\mu = \mu_{max}/10$. The least mean square algorithm of the adaptive LMS filter may thus be realized as outlined below.

1. Initialization of the algorithm by setting the control variable to n=0; selecting the start coefficients $b_k[n=0]$ for k=0, . . . , N−1 at the onset of the execution of the algorithm (e.g., $b_k[0]=0$ for k=0 . . . N−1 and e[0]=d[0]); and selecting the amplification factor $\mu < \mu_{ma}$, e.g., $\mu = \mu_{max}/10$.
2. Storing of the reference signal x[n] and of the signal d[n].
3. FIR filtering of the reference signal according to:

$$d\char`\^[n] = y[n] = \sum_{k=0}^{N} b_k[n] \cdot x[n-k]$$

4. Determination of the error: $e[n] = y[n] - d\char`\^[n]$
5. Updating of the coefficients according to:

$$b_k[n+1] = b_k[n] + 2 \cdot \mu \cdot e[n] \cdot x[n-k] \text{ for } k=0, \ldots, N-1.$$

6. Execution of the next iteration step n=n+1 and repeating steps 2 to 6.

A filter employing an LMS algorithm converges faster, the greater the convergence parameter/step size µ is. Thus, the step size is chosen between individual iteration steps. The quality of the mean-squared-error (MSE) which can be attained also depends on this step size µ. The smaller the convergence parameter/step size µ is chosen, the smaller the eventual deviation to the iteratively approached target value, that is, the smaller the error signal e[n], which is attained by the adaptive filter, becomes. A small error signal e[n], ideally an error signal e[n]=0 is desirable so as to attain the most effective noise reduction, that is, the most complete elimination of the error signal.

At the same time, however, the selection of a relatively small convergence parameter/step size µ also implies that a greater number of iteration steps are required for approaching the desired target value. Consequently the required convergence time of the adaptive filter increases. In practice, the selection of the convergence parameter µ thus always implies a compromise between the quality of the approach to the target and thus the quality of the attainable noise reduction, and the speed of the adaptation of the underlying algorithm.

In view of the desired attainable accuracy of the adaptation, a relatively small step size µ is commonly chosen. However, it may be a disadvantageous effect of small step sizes µ that, for example, the adaptation of the LMS algorithm cannot adapt itself in a sufficiently rapid manner to a rapidly changing reference signal, for example transients such as impulses containing sound portions. As a consequence, transients containing sound portions cannot be reduced to a desired extent.

Figure 3:
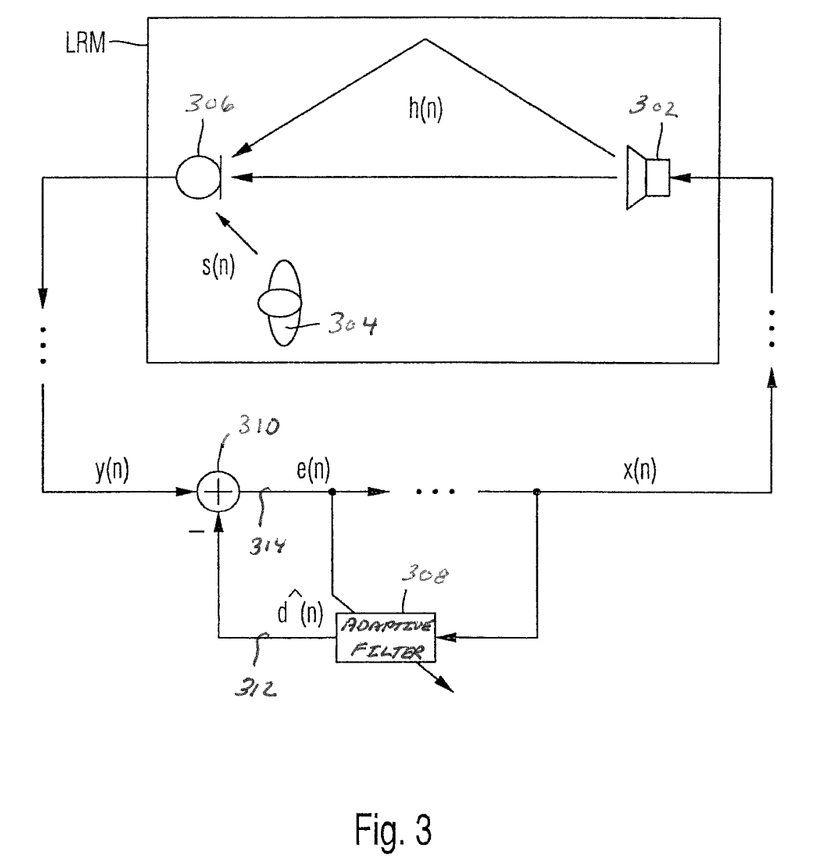
FIG. 3 is an illustration of a Loudspeaker-Room-Microphone (LRM) arrangement for echo suppression.

FIG. 3 illustrates a loudspeaker-room-microphone (LRM) system, in which an adaptive filter is used for echo suppression. This system includes a loudspeaker 302, a position S of a speaker, a microphone 306, a speaker signal s(n) and an impulse response h(n) of a transmission path between the loudspeaker 302 and the microphone 306. A basic structure of a signal processing branch for suppressing echo signals has an adaptive filter 308 and a summing element 310. A feedback signal d^(n) is generated from the signal x(n) for controlling the loudspeaker 302 via the adaptive filter 308. Furthermore, the output signal d^(n) on line 312 is subtracted from the microphone signal y(n) to generate an error signal e(n) on a line 314 for the adaptation of the filter coefficients of the adaptive filter. The filter coefficients for the adaptive filter may be:

$$b_k(n) = [b_0(n), b_1(n), \ldots, b_{NH-1}(n)]^T$$

By convoluting the loudspeaker signal x(n) with the approximated impulse response, the feedback signal d^(n) is approximated. The approximated impulse response $b_k(n)$ aims to match the impulse response h(n) of the real transmission path between loudspeaker 302 and the microphone 306. If this is the case, a decoupling of the total system can be attained by subtracting the approximated feedback signal d^(n) from the microphone signal y(n).

However, the compensation and suppression, respectively, of an undesired echo has proven to be particularly difficult in practice, because the adaptation of the filter $b_k(n)$ is disrupted by the strong correlation between the excitation signal x(n) for the loudspeaker and the local signal s(n) of the speaker/vehicle occupant at the location 304:

$$E\{x(n)s(n+1)\} \neq 0$$

The so-called Frequency Domain Block Least Mean Square (FBLMS) algorithm is an efficient approach to implement an adaptive filter in the spectral domain. The FBLMS algorithm may be implemented as a "overlap-save" as well as a "overlap-add" algorithm. The "overlap-save" algorithm may be implemented more efficiently than the "overlap-add" algorithm and is preferred in the applications described below.

Figure 4:
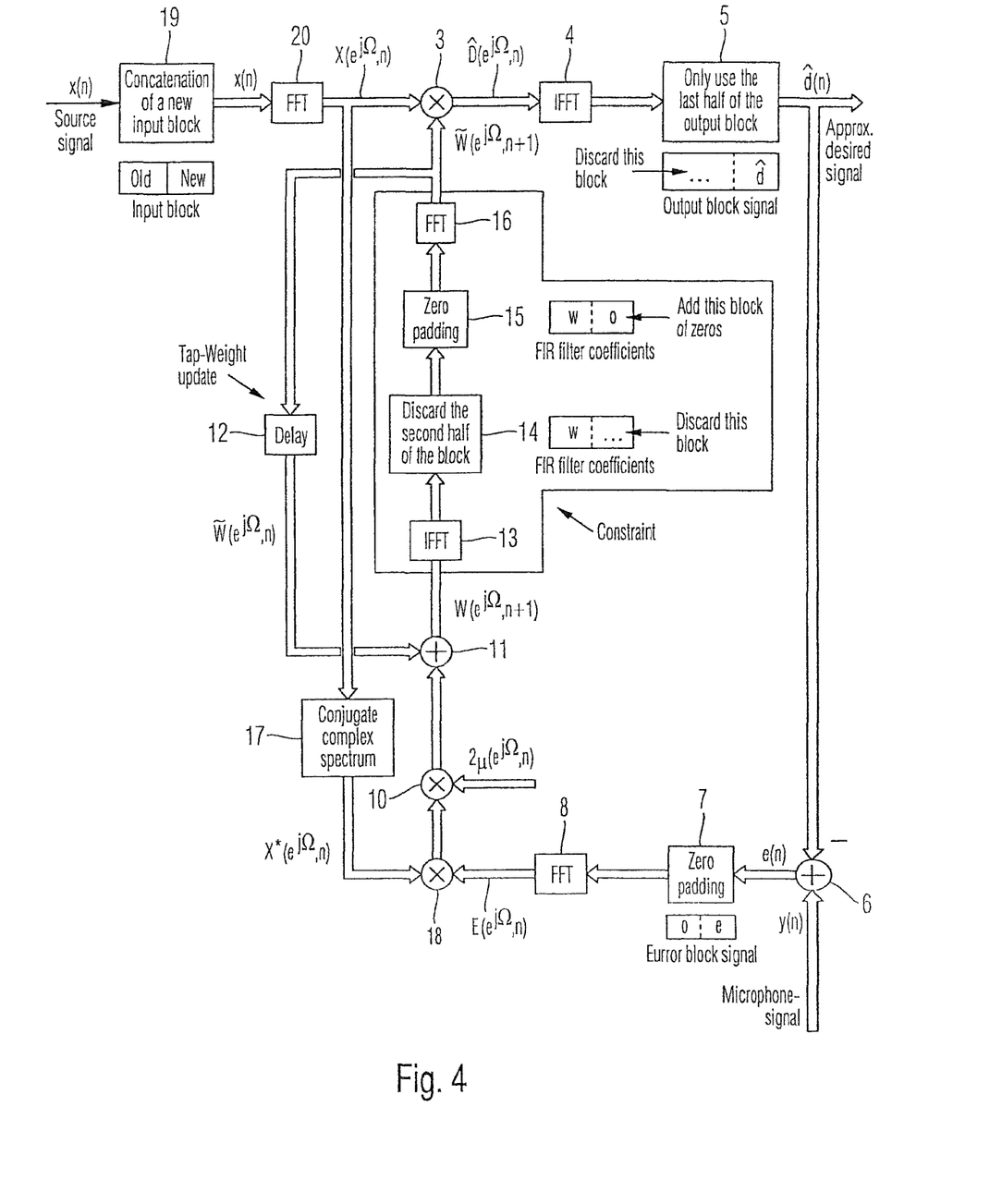
FIG. 4 is a block diagram illustration of a mode of operation of an overlap save Frequency Domain Block Least Mean Square (FBLMS) algorithm.

FIG. 4 illustrates the mode of operation of an "overlap-save" FBLMS algorithm, including a concatenation unit 19 for providing a new input block signal, a unit 5 for using the last half of the output block signal, a zero padding unit 7 for filling with zeros, a unit 14 for erasing the second half of the block, a second zero padding unit 15 for adding zeros, and a complex conjugate unit 17 for forming a conjugated complex spectrum. Furthermore, signal multipliers 3, 10 and 18, functional blocks for Fast Fourier Transformation (FFT) 20, 8 and 16, two functional blocks for the Inverse Fast Fourier Transformation (IFFT) 4 and 13, a delay unit 12, and two signal adders 6 and 11 are also included.

The output of the concatenation unit 19 provides a new input block signal that is supplied to a Fast Fourier Transformation (FFT) 20. The frequency domain output of the FFT 20 is input to the signal multiplier 3 and to the complex conjugate unit 17. An output of the signal multiplier 3 is supplied to the Inverse Fast Fourier Transformation (IFFT) 4, and the resultant time domain signal is input to the unit for using the last half of the signal. The output of the unit 5 is supplied to the signal adder 6, the output of which is supplied to the second zero padding unit 7 for filling the first half of the block with zeros.

The output of the second zero padding unit is supplied to the Fast Fourier Transformation (FFT) 8, the output of which is supplied to the signal multiplier 18. The output of the signal multiplier 18 is supplied to the signal multiplier 10. In turn, the output of the signal multiplier 10 is supplied to the signal adder 11. The output of the delay unit 12 is supplied to the other input of the signal adder 11, and the signal adder 11 provides an output to the Inverse Fast Fourier Transformation (IFFT) 13.

The output of the inverse Fast Fourier transformation (IFFT) 13 is supplied to the unit 14 for erasing the last half of the block, the output of which is supplied to the zero padding unit 15. The output of the zero padding unit 15 is supplied to the Fast Fourier Transformation (FFT) 16, the output of which is supplied to the other input of the signal multiplier 3. The output of the FFT 20 is also supplied to the complex conjugate unit 17 for forming a conjugated complex spectrum, the output of which is supplied to the other input of the signal multiplier 18.

The input of the concatenation unit 19 for building a new input block signal receives a scanned input signal x[n] and forms an input block signal, which, according to a chosen overlap consists of the signal portion of a previously processed signal block "old" and a signal portion of the currently received input signal x[n]. This input block signal is supplied to the FFT 20, at the output of which is a frequency domain signal $X(e^{j\Omega},n)$. This output signal $X(e^{j\Omega},n)$ is subsequently supplied to the signal multiplier 3 as well as to the complex conjugate unit 17 to form a conjugated complex spectrum.

The signal $\hat{D}(e^{j\Omega},n)$, is input to the IFFT 4, and the resultant time domain signal is the unit for using the last half of the output block signal for further processing. In the unit 5, the last half of the block signal (overlap=50%) is used for building the output signal $\hat{d}[n]$.

The output signal $\hat{d}[n]$ is supplied to the signal adder 6, the other input of which receives the signal y[n] from the microphone (not shown). The signal $\hat{d}[n]$ is inverted thereby and subtracted from signal y[n] in the signal adder 6, whereby the error signal e[n] is formed at the output of the signal adder 6. The error signal e[n] is supplied to the second zero padding unit 7 for filling with zeros in that the first half of this error block signal is filled with zeros (overlap 50%, see functional block 19 for building the new input block signal).

The signal embodied in this manner at the output of the second zero padding unit 7 is provided to the FFT 8, which provides frequency domain signal, at the $E(e^{j\Omega},n)$, which is multiplied with the signal $X^*(e^{j\Omega},n)$. The signal resulting at the output of the signal multiplier 18 is subsequently supplied to the signal multiplier 10.

In the signal multiplier 10, this output signal is multiplied with $2\cdot\mu(e^{j\Omega},n)$ where $\mu(e^{j\Omega},n)$ corresponds to the time- and frequency dependent step size of the adaptive filter. The output signal of the signal multiplier 10 formed in such a manner is subsequently added in the signal adder 11 to the signal $\tilde{W}(e^{j\Omega},n)$ from the delay unit 12. The resulting output signal of the signal adder 11 is supplied to the IFFT 13 to provide a time domain signal.

Subsequently, the second half of the block of filter coefficients of the FIR filter is discarded in unit 14 and is substituted with coefficient values of zeros in the zero padding unit 15. The FFT 16 transforms the signal into a signal in the frequency domain, and the resultant signal is supplied to the signal multiplier 3 for multiplication with signal $X(e^{j\Omega},n)$. The signal processing units 13-16 are identified in FIG. 4 as "constraint" in response to an "overlap save" FBLMS algorithm as shown in FIG. 4.

In the present examples, an FBLMS algorithm comprising a standardized, frequency-selective, time variant adaptation step size $\mu(e^{j\Omega},n)$ is used. This adaptation step size $\mu(e^{j\Omega},n)$ is standardized to the power density spectrum of the input signal $X(e^{j\Omega},n)$. The standardization has the effect of compensating fluctuations of the amplitude of the input signal, which allows for adaptive filters to converge with a higher speed. This standardization has a positive effect in particular in response to the use of an FBLMS algorithm as a core component of an AEC system because a speech signal, which encompasses a distinct fluctuation in amplitude, is used as input signal and conventional adaptive filters thus always encompass a slow convergence speed. This disadvantage of conventional adaptive filters can be avoided in a simple manner by standardization in the spectral domain.

A further problem that has to be addressed in an AEC algorithm for processing speech signals is the so-called counter talk (also known as exchange talk or double talk). When an FIR filter is adaptively adjusted by an LMS algorithm it may occur that the filter coefficients are adjusted incorrectly. This occurs, for example, when double talk is not identified correctly or too late.

To overcome this problem in the frequency domain, there are two basic approaches applicable. Each of these approaches is based on the same operating principle that can be described as follows. When time counter talk occurs, the adaptation step size μ is adjusted towards zero so that the previously determined model of the loudspeaker-room-microphone (LRM) system is not destroyed by the strong, close-talking signal, but instead remains "frozen" until the close-talking signal has faded away as compared to the echo of the distant speaker. On the one hand, the normal and standardized coherence function, respectively, between the source (x[n]) and the microphone signal (y[n]) and between the output signal of the adaptive filter core ($\hat{d}[n]$) and the microphone signal (y[n]), respectively, may be taken.

However, better results can be achieved when using a so-called "double talk detector". Ideally, the optimal adaptation step size results from the ratio of the power density spectrums of the residual echo (b[n]) and of the error signal (e[n]). In practice, however, the direct computation thereof is not possible because the required residual echo signal cannot be extracted. However, this residual echo signal (b[n]) may be approximated. The power density spectrum of the residual echo signal may be approximated by way of filtering the power density spectrum of the input signal with the power density spectrum of the current echo path model (W(k)). The following equation applies:

$$\mu(n, k) = \frac{\Phi_{bb}(n, k)}{\Phi_{ee}(n, k)} = \frac{[W(n, k)]^2 * \Phi_{xx}(n, k)}{\Phi_{ee}(n, k)}$$

Applying this equation for the adaptation step size μ does not only solve the problem of counter talk but also a problem occurring in response to sudden changes of the room impulse response. This can be explained by the above formula: even though the error signal increases in double-talk situations, the residual echo does not. Consequently, the adaptation step size is reduced, whereas the residual echo as well as the error signal increase in response to a sudden change of the LRM system and the adaptation step size thus remains on a greater value which is required for a new adaptation of the adaptive filter.

In contrast, with established solutions in the time domain, a suddenly occurring change of the LRM system, for example caused by a motion in the room, represents a problem which cannot easily be solved. Such a problem is typically dealt with by a so-called "rescue detector". In response to a sudden increase of the error signal, said "rescue detector" differentiates whether this change was caused by an active close speaker or by a changing room impulse response. As explained above, such a "rescue detector" is now dispensed with when determining the step size μ according to the above formula, whereby the algorithm, which is to be used, is simplified considerably.

Due to the very strict ITU recommendations for AEC systems (see: ITU-T, "Recommendation P 0.832, Subjective performance evaluation of hands-free terminals", May 2000), even the already high echo attenuation which an AEC algorithm implemented in the spectral domain reaches, is not sufficient to fulfill the required conditions. For this reason, use of so-called "post filters" is suggested, which are supplied downstream from a conventional AEC arrangement, with the aim of attenuating remaining residual echoes. Such a post filter is thereby also converted in the spectral domain and can be computed as Wiener Filter as follows:

$$H(n, k) = \frac{\Phi_{ee}(n, k) - \Phi_{bb}(n, k)}{\Phi_{ee}(n, k)}$$
$$= \frac{\Phi_{ee}(n, k) - |W(n, k)|^2 * \Phi_{xx}(n, k)}{\Phi_{ee}(n, k)}$$
$$= 1 - \mu(n, k)$$

A link between the optimal adaptation step size and a post filter designed as optimal Wiener Filter can be seen from the above equation for computing a post filter for the residual echo suppression in the spectral domain. The analysis of an AEC arrangement, which combines all of the functions described so far, is illustrated below.

Figure 5A:
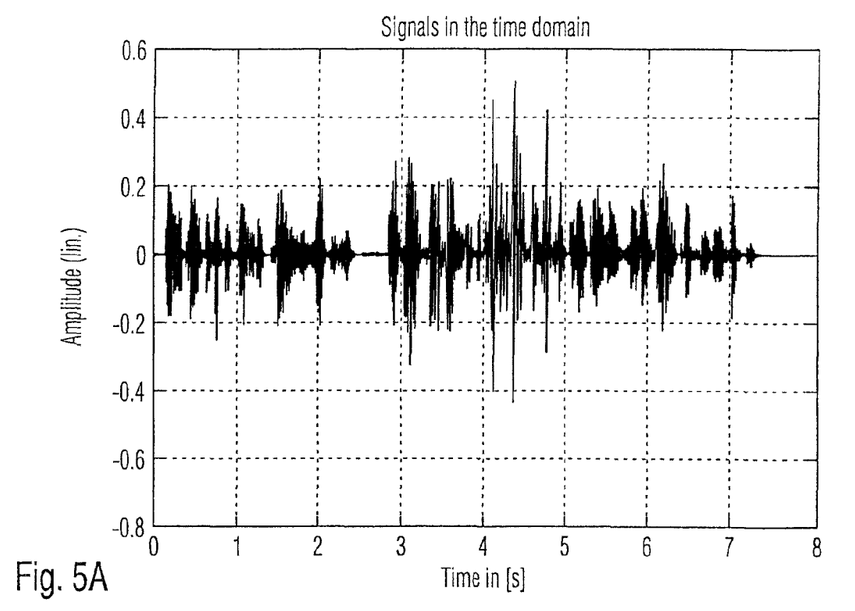
FIGS. 5A-5D are plots illustrating the response of an overlap save Acoustic Echo Cancellation (AEC) arrangement in response to an overlap of 50%.
Figure 5B:
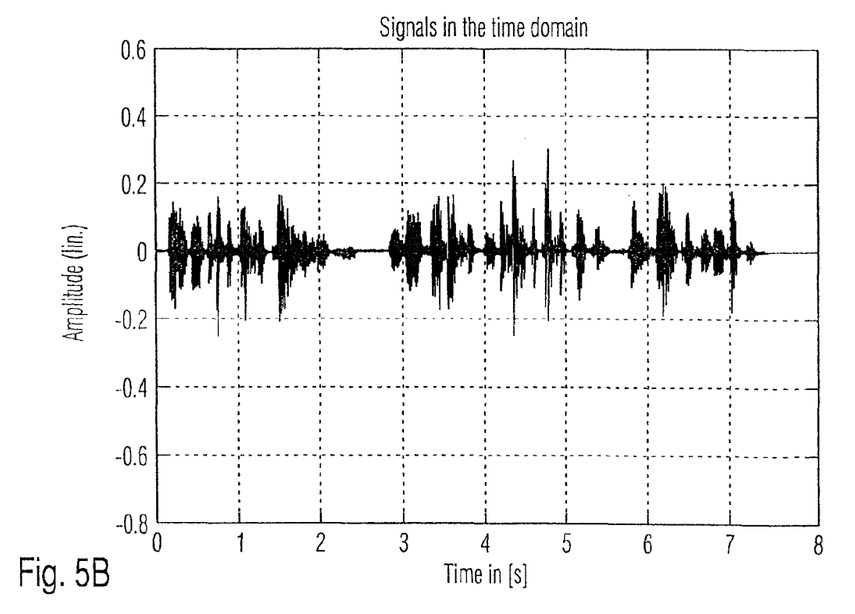
Figure 5C:
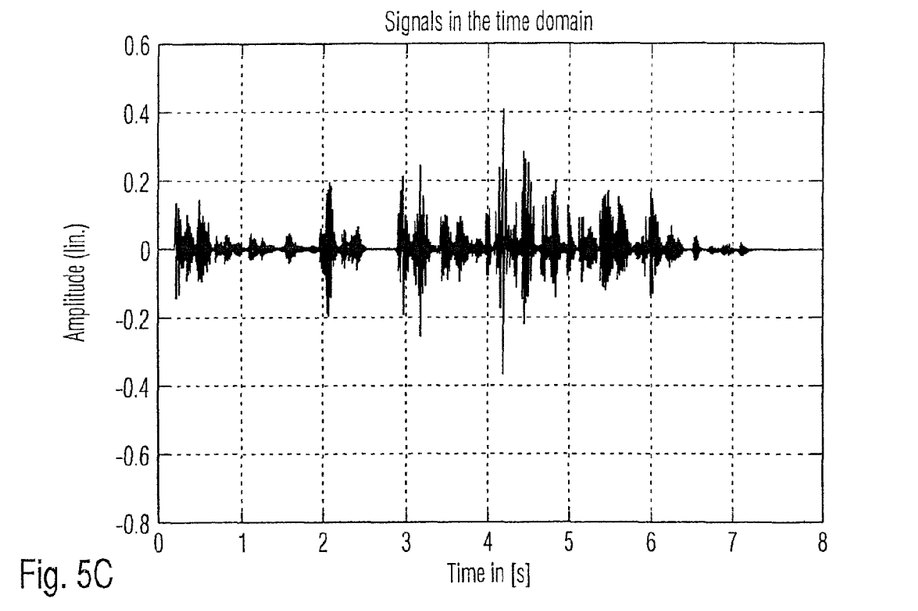
Figure 5D:
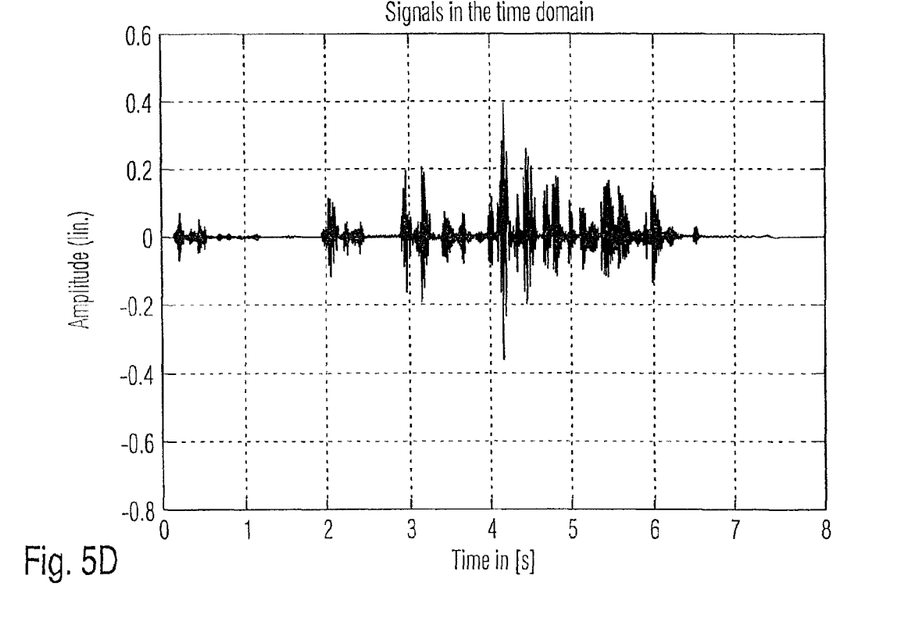

FIGS. 5A, 5B, 5C and 5D show the chronological course of a test sequence of exemplary speech signals (FIG. 5A), the microphone signal in an exemplary LRM arrangement (FIG. 5B), the approximated microphone signal of an exemplary LRM arrangement (FIG. 5C) and the resulting error signal (FIG. 5D). The time is plotted in seconds along the abscissa in all of the FIGS. 5A, 5B, 5C and 5D; the ordinate identifies the amplitude of the corresponding signals in a linear illustration measure in all of the FIGS. 5A, 5B, 5C and 5D. The illustrated signal processing according to FIG. 4 thereby uses a feed (overlap) of 256 scanning values per signal block and thus a 50% overlap of the signals in consecutive processing steps.

The test sequence shown in FIG. 5A is a sequence that only consists of speech signals without any background noise. Until approximately the fourth second, only a man speaks who is then superimposed by a female close speaker (counter talk) between the fourth and sixth second. In addition thereto, a sudden change of the room impulse response was simulated at approximately the second second, in that the currently available LRM model was completely rejected and was replaced by a random noise sequence with values between −1 and 1.

It can be seen from FIGS. 5A, 5B, 5C and 5D that the AEC system operates quite satisfactorily with a 50% overlap. It can also be seen that, despite the use of the standardized, adaptive adaptation step size, the AEC filter has a moderate convergence speed. It can furthermore be seen that the adaptive post filter also works well at the onset of the adaptation and that the stationary echo attenuation can be identified as good. However, it is disadvantageous that, in addition to the slow convergence speed, the recovery time after a suddenly occurring change of the impulse response of the LRM arrangement supplied therewith occupies a relatively long period of time.

This problem may be solved in that the feed, with which a new input data block is formed, is reduced. An adaptation via "old" input data is carried out more often therewith and a memory-related adaptive filter is thus attained. Even though such a memory-related adaptive filter requires more computation time, this advantageously leads to a considerably higher convergence speed. The following example does not use a feed of 256 scanning values per signal block, that is, an overlap of 50% according to FIG. 5, but only a feed of 64 scanning values per signal block, which corresponds to an overlap of 87.5%.

Figure 6A:
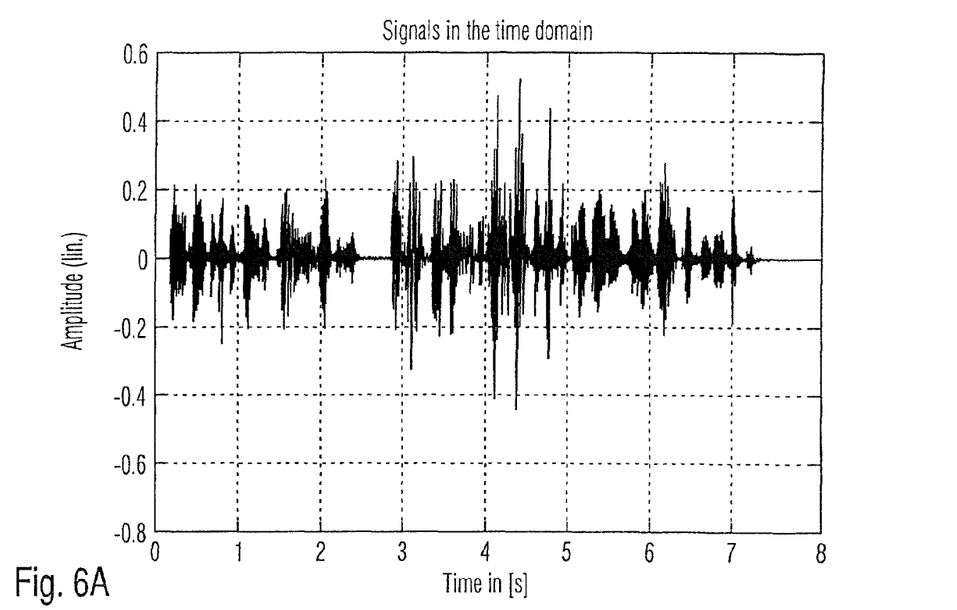
FIGS. 6A-6D are plots illustrating the response of an overlap save AEC arrangement in response to an overlap of 87.5%.
Figure 6B:
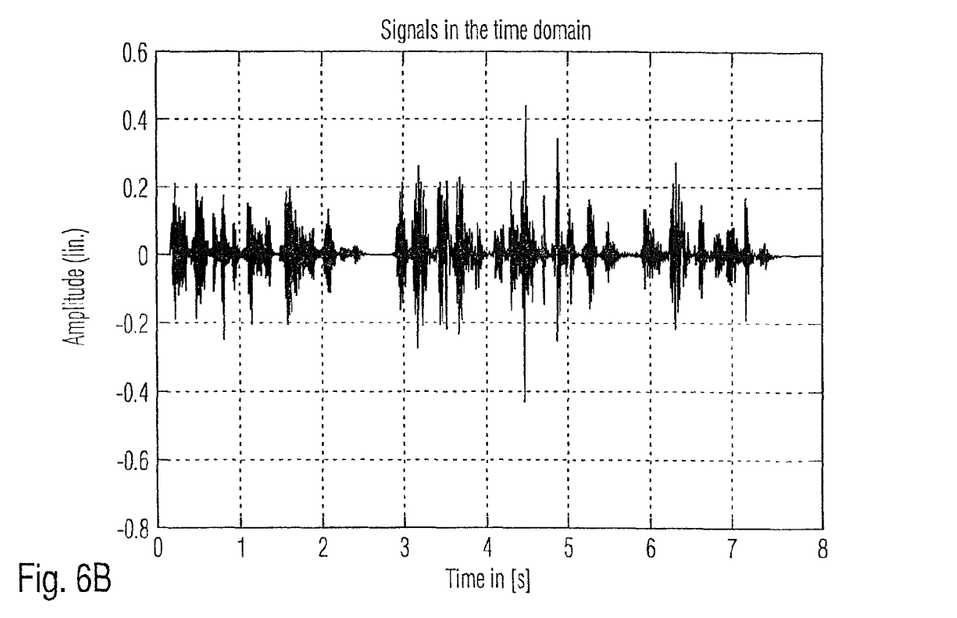
Figure 6C:
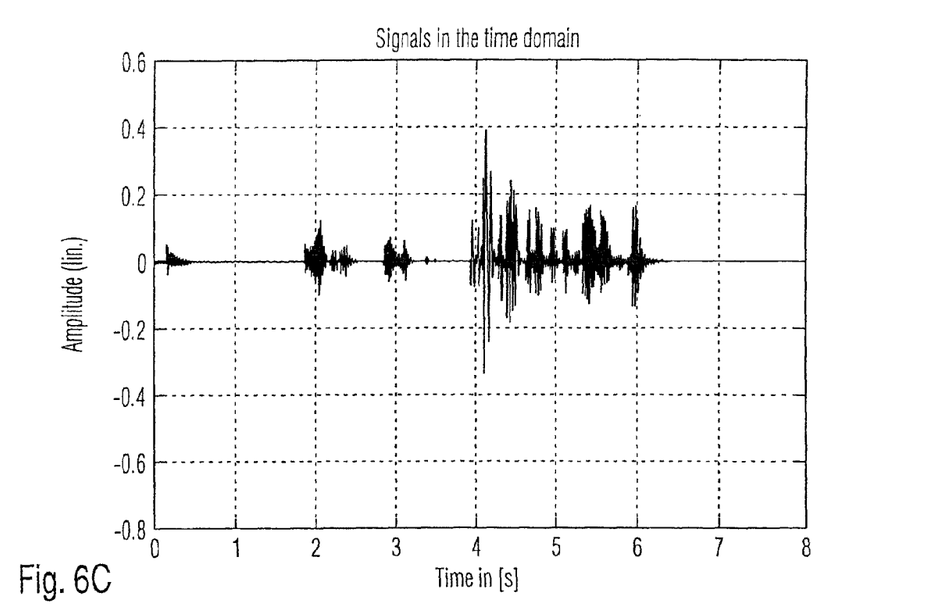
Figure 6D:
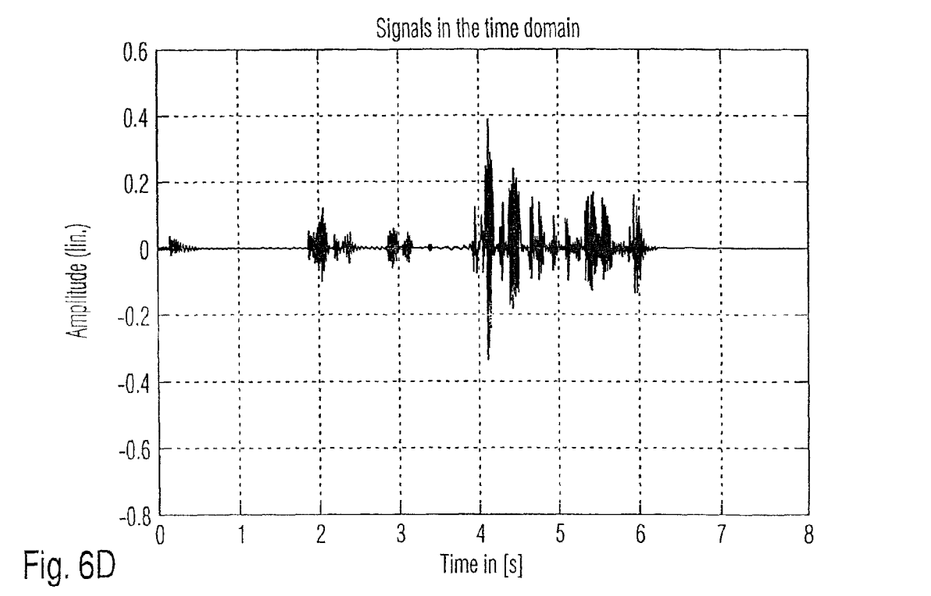

The corresponding results are illustrated in FIGS. 6A, 6B, 6C and 6D that in turn show the chronological course of a test sequence from exemplary speech signals (FIG. 6A), the microphone signal of an exemplary LRM arrangement (FIG. 6B) which is the same as in FIG. 5B, the approximated microphone signal of this exemplary LRM arrangement (FIG. 6C), and the resulting error signal (FIG. 6D). The time is again plotted in seconds along the abscissa in all of the FIGS. 6A, 6B, 6C and 6D; the ordinate identifies the amplitude of the corresponding signals in a linear illustration measure in all of the FIGS. 6A, 6B, 6C and 6D.

The illustrated signal processing according to FIG. 4 thereby uses a feed (overlap) of 64 scanning values per signal block and thus an overlap of the signals in consecutive processing steps of 87.5%. The test sequence according to FIG. 6A is again a sequence, which only includes speech signals without background noise. Until approximately the fourth second, only a man speaks, who is then superimposed by a female close speaker (counter talk) between the fourth and sixth second. In addition thereto, a sudden change of the room impulse response was simulated at approximately the second second, in that the currently available LRM model was completely rejected and was replaced by a random noise sequence with values between −1 and 1.

In a comparison of FIGS. 5C and 6C as well as 5D and 6D, the results according to FIGS. 6C and 6D confirm that a memory-related adaptive filter encompasses a higher convergence speed. It can furthermore be seen from FIGS. 6C and 6D in comparison with the signal courses according to the respective FIG. 5 that the effect of the post filter dwindles more and more with an increasing degree of overlap. This means that it is possible to forego the post filter when using a higher degree of overlap, because the effect of the post filter in these cases approaches zero. In doing so, an increased requirement of computing time of the arrangement according to FIG. 4 resulting from the small feed can advantageously be compensated for at least partially.

The sole remaining problem is the system delay, which is too high and which encompasses an AEC arrangement, which is embodied according to the example according to FIG. 4. This system delay exceeds the threshold values admissible according to ITU. However, if a Partitioned Frequency Domain Block Least Mean Square (PFBLMS) algorithm is used instead of the FBLMS algorithm, the system delay can theoretically be adjusted to any value. This is because the system delay in such an AEC arrangement is no longer a function of the total length of the approximated LRM model, but only of the length of the individual partitions. If the entire LRM model is thus divided into many small partitions, it can be ensured that the total delay remains within the guidelines given by the ITU.

Figure 7:
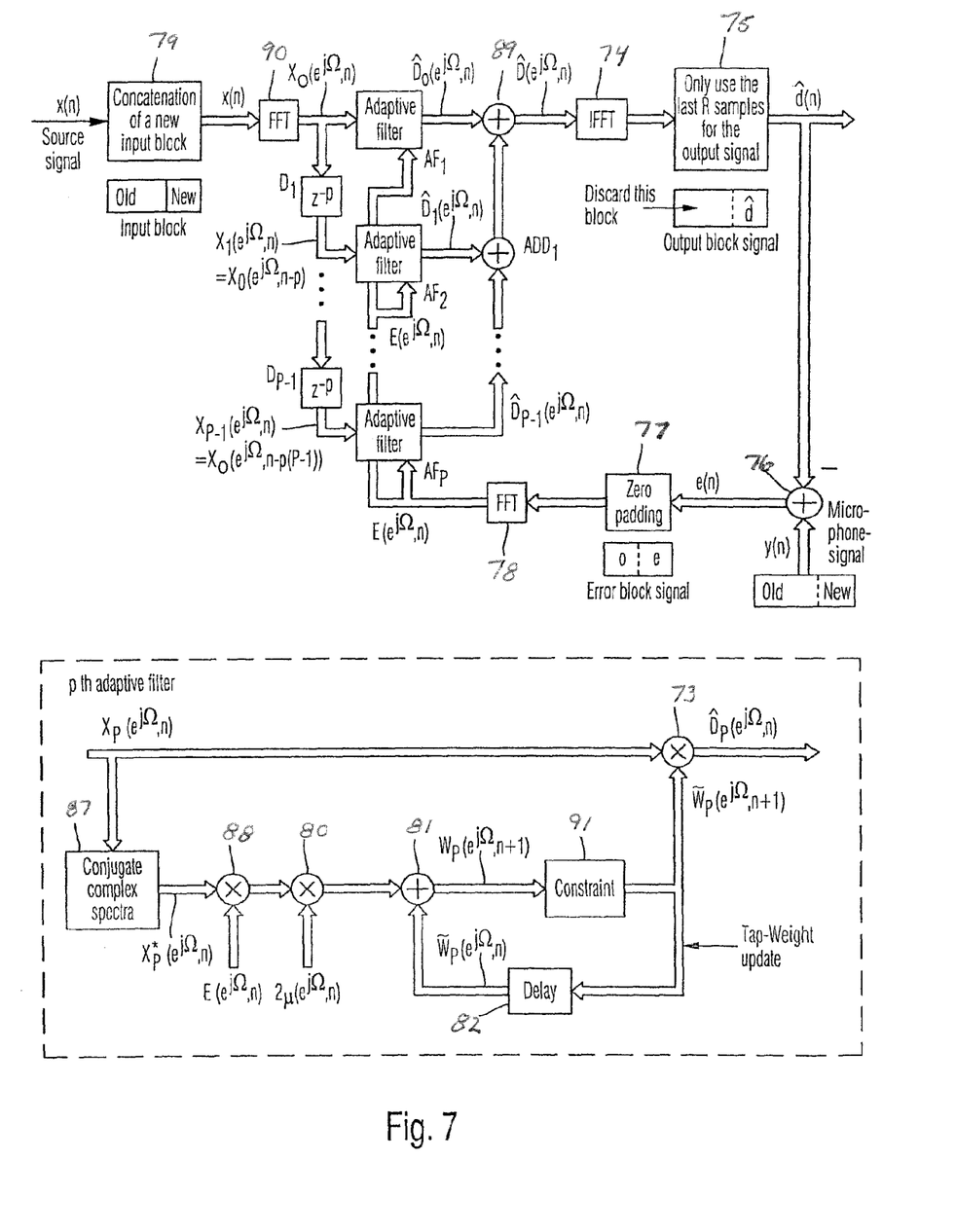
FIG. 7 is a block diagram illustration of a mode of operation of a Generalized Multi Delay Adaptive Filter (GMDF) algorithm with partitioning in the spectral domain.

If the PFBLMS algorithm has any feed, a so-called Generalized Multi Delay Adaptive Filter (GMDF) algorithm as illustrated below is created. FIG. 7 shows the mode of operation of the GMDF algorithm in a flowchart including a concatenation unit 79 for assembling a new input block signal; a unit 75 for use of the last part of the output block signal; a zero padding unit 77 for filling with zeros; a functional block 87 for forming a conjugated complex spectrum, three signal multipliers 73, 80 and 88; FFTs 90 and 78; an IFFT 74; a delay unit 82; signal adders 76, 81 and 89; a plurality P of adaptive filters $AF_1$, $AF_2$ ... $AF_P$; a plurality P−1 of delay units $D_1$, $D_2$ ... $D_{P-1}$; and a plurality P−1 of signal adders $ADD_1$, $ADD_2$ ... $ADD_{P-1}$. The exemplary P-th adaptive filter illustrated on the bottom of FIG. 7 thereby represents the plurality P of adaptive filters $AF_1$, $AF_2$ ... $AF_P$.

Each of the plurality P of adaptive filters $AF_1$, $AF_2$ ... $AF_P$ includes a complex conjugate unit 87, signal multipliers 73, 80 and 88, a signal adder 81, a delay unit 82 and a functional block 91 (Constraint). This functional block 91 is shown and described in detail in FIG. 4 and includes the units 13-16 of FIG. 4.

Referring still to FIG. 7, the output of the concatenation unit 79 is supplied to the FFT 90, which provides a frequency domain signal to the adaptive filter $AF_1$ and to an input of the delay unit $D_1$ having the transfer function $z^{-P}$. The output of the delay unit $D_1$ is supplied to the adaptive filter $AF_2$ and to the input of the subsequent delay unit $D_2$. The output of the delay unit $D_2$ is provided to the subsequent delay unit $D_3$ and so forth, until at last the output of the delay unit $D_{P-2}$ is supplied to the delay unit $D_{P-1}$.

The output of each of the delay units $D_1$, $D_2$ ... $D_{P-1}$ is supplied to one of the adaptive filters $AF_2$, $AF_3$ ... $AF_P$ and there, in particular, to the complex conjugate 87 and to the signal multiplier 73 (see in FIG. 7 the input labeled with $X_P(e^{j\Omega},n)$ into the P-th adaptive filter illustrated on the bottom of FIG. 7). The output of the delay unit $D_1$ is supplied to the adaptive filter $AF_2$, the output of the delay unit $D_2$ is supplied to the adaptive filter $AF_3$ and so forth, until at last the output of the delay unit $D_{P-1}$ is supplied to the adaptive filter $AF_P$. The output of the adaptive filters $AF_2$, $AF_3$ ... $AF_P$ is supplied to corresponding inputs of signal adders $ADD_1$, $ADD_2$ ... $ADD_{P-1}$. The output of the signal adder $ADD_{P-1}$ is supplied to an input of signal adder $ADD_{P-2}$, the output of the signal adder $ADD_{P-2}$ is supplied to an input of signal adder $ADD_{P-3}$ and so on until at last the output of the signal adder $ADD_2$ is supplied to an input of signal adder $ADD_1$. The output of signal adder $ADD_1$ is supplied to an input of signal adder 89.

The output of the signal adder 89 is supplied to the IFFT 74, and to the resultant time domain signal is provides to the unit 75 for using the last R samples of the output block signal. The output of the functional block 75 for using the last R samples of the output block signal is supplied to the signal adder 76, the output of which is supplied to the zero padding unit 77. The FFT 78 receives the zero padded data and the resultant frequency domain signal is supplied to each of the adaptive filters $AF_1$, $AF_2$ ... $AF_P$ (see also the input identified with $E(e^{j\Omega},n)$ in the lower part of FIG. 7 for each adaptive filter $AF_1$, $AF_2$ ... $AF_P$).

The input $X_p(e^{j\Omega},n)$ to the exemplary adaptive filter $AF_1$ in the lower part of FIG. 7 representing the P adaptive filters $AF_1$, $AF_2$, ... $AF_P$ is supplied to the complex conjugate unit 87 for forming a conjugated complex spectrum and to the signal multiplier 73. The output of the complex conjugate unit 17 provides the spectrum $X_P^*(e^{j\Omega},n)$, which is supplied to the signal multiplier 88 and the output of the signal multiplier 88 is supplied to the first input of the signal multiplier 80. The output of the signal multiplier 80 is supplied to an input of the adder 81, the output of which is supplied to the constraint 91.

The output of the constraint 91 is supplied to the delay unit 82, the output of which is supplied to the signal adder 81. This functional block constraint corresponds to the one illustrated and described with reference to FIG. 4, which includes units 13-16.

The input of the concatenation unit 79 receives a scanned input signal x[n] for assembling a new input block signal and focus an input block signal, which includes the signal portion of a previously processed signal block "old" and a signal portion of the currently received (new) input signal x[n] according to a chosen overlap. This input block signal is routed to the FFT 20, at the output of which a frequency domain signal $X_0(e^{j\Omega},n)$ is provided. This output signal $X_0(e^{j\Omega},n)$ is subsequently supplied to the adaptive filter $AF_1$. The output signal $X_0(e^{j\Omega},n)$ is furthermore converted into signal $X_1(e^{j\Omega},n)=X_0(e^{j\Omega},n\text{-p})$ the of delay unit $D_1$ having a transfer function $z^{-P}$ and is provided to the adaptive filter $AF_2$.

The signal $X_1(e^{j\Omega},n)=X_0(e^{j\Omega},n\text{-p})$ at the output of the delay unit $D_1$ is also converted into the signal $X_2(e^{j\Omega},n)=X_0(e^{j\Omega},n\text{-p}\cdot2)$ by way of delay unit $D_2$ having a transfer function $z^{-P}$ and is provided to the adaptive filter $AF_3$ and so forth, until the output signal is converted into the signal $X_{P-1}(e^{j\Omega},n)=X_0(e^{j\Omega},n\text{-p}*(P-1))$ by way of the delay unit $D_{P-1}$ having a transfer function $z^{-P}$ and is provided to the adaptive filter $AF_P$. Corresponding output signals $\hat{D}_0(e^{j\Omega},n)$, $\hat{D}_1(e^{j\Omega},n)$ ... $\hat{D}_{P-1}(e^{j\Omega},n)$ (are thereby provided by the adaptive filters $AF_1$, $AF_2$ ... $AF_P$, which on the bottom of FIG. 7 are represented by one exemplary adaptive filter, and added up in signal adders $ADD_1$, $ADD_2$ ... $ADD_{P-1}$ and signal adder 22 as described above.

The output signal $\hat{D}(e^{j\Omega},n)$ of the signal adder 89 is subsequently supplied to the IFFT 74, and the resultant time domain signal is provided to the unit 75 for extracting the last R samples of the output block signal. In the unit 75, this last portion of the block signal is used to generate the output signal $\hat{d}[n]$. This output signal $\hat{d}[n]$ is supplied to an input of the signal adder 76, the other input of which receives the signal y[n]. The signal $\hat{d}[n]$ is subtracted from signal y[n] in the signal adder 76, whereby the error signal e[n] is thus formed at the output of the signal adder 76. The error signal e[n] is routed to the zero padding unit 77 for filling with zeros, in which the first portion of the error block signal is filled with zeros.

The zero padded signal from the unit 77 is processed by the FFT 78, and the resulting frequency domain signal is provided to the adaptive filters $AF_1$, $AF_2$ ... $AF_P$. The signal resulting from the signal multiplier 88 is multiplied with signal $2\cdot\mu(e^{j\Omega},n)$ in the signal multipliers 80 of the adaptive filters $AF_1$, $AF_2$ ... $AF_P$, wherein $\mu(e^{j\Omega},n)$ corresponds to the time varying, frequency dependent step size of the adaptive filters. In the signal adder 81, the output signal of the signal multiplier 80 formed in such a manner is subsequently added to the fed-back signal $W^-_P(e^{j\Omega},n)$ which emanates from the output signal $W_P(e^{j\Omega},n+1)$ of the signal adder 81 being transformed into the signal $W^-_P(e^{j\Omega},n+1)$ by the constraint 91 and being delayed by the delay unit 82.

As compared to the FBLMS algorithm, the GMDF algorithm illustrated in FIG. 7, as well as the PFBLMS algorithm, requires more computation time to some extent, depending on the adjustment of the parameters of the algorithms. A measure with which the computation time can be reduced is the use of the respective "unconstraint" version of the corresponding algorithm. As compared to the corresponding "unconstraint" versions of the algorithms, this leads to a convergence speed which is approximately only half. An option of how to increase the convergence speed in spite of the use of a "constraint" algorithm is the use of so-called lattice filters, for example, instead of the pure delay units in the PFBLMS and GMDF algorithm, respectively.

Lattice filters are known and have the effect that the input signal is decorrelated and orthogonalized, respectively, to a greater extent, which, in turn, leads to a higher convergence speed as already specified above. Contrary thereto, a further increase of the convergence speed cannot be attained when using such lattice filters with the corresponding "constraint" alternatives of the presented algorithms.

Another technique that may allow omitting the constraint may be to implement the functional block of the constraint as a complex smoothing filter directly in the spectral domain, without employing Fast Fourier or Inverse Fast Fourier Transformation, respectively. In this way, a considerable economization in view of the required computation time of the smoothing filter used can be achieved.

However, a so-called sequential constraint represents the most advantageous option for reducing the required computation time in response to the conversion of the PFBLMS and GMDF algorithms, respectively. This means that such a constraint is used only once for a certain part of the signal, that is, in each case in at least one but not all of the adaptive filters $AF_1$, $AF_2$, . . . , $AF_P$, which operate in parallel, during the processing of an individual signal block (also identified as frame). The respective signal partial range on which the constraint is used and the adaptive filter in which the constraint is used, respectively, then changes sequentially in the subsequent frames. Consequently, almost the same convergence speed as the corresponding "constraint" algorithm is achieved, but which, in comparison therewith, advantageously requires a considerably smaller computation time.

Another AEC system for echo suppression that operates in the spectral domain uses the GMDF algorithm with sequential constraint. The number of partial spectra that are to be finalized sequentially thereby results from the ratio of the required total filter length to the maximally permissible total delay. The feed in response to the formation of new signal blocks and the overlap between "old" and "new" signal portions in consecutive frames resulting therefrom, respectively, result from a compromise between the computation time requirement, the attained echo attenuation in response to counter talk and the convergence speed of the used algorithm.

This feed is thus to comply with the afore-mentioned ITU standards. Accordingly, the recovery time, in particular after a sudden change of the impulse response of the loudspeaker-room-microphone (LRM) system has to be sufficiently short. In a motor vehicle, such a sudden change of the impulse response of the loudspeaker-room-microphone (LRM) system occurs, for example, when a window of the motor vehicle is opened. At the same time, the echo attenuation in response to counter talk has to be sufficiently high so as to be able to maintain the threshold values required according to ITU. The use of a post filter is optional. However, if the overlap is chosen relatively small, for example 50%, the use of the afore-mentioned post filter is advantageous.

The exemplary systems described above with reference to FIGS. 4 and 7 involve partitioning in the spectral domain. However, partitioning in the time domain, in part or in total, is applicable as well. In such a system, each time partition is transformed individually into the spectral domain. Accordingly, only signals in the time domain, i.e., real signals, are delayed and not signals in the spectral domain, i.e., complex signals, resulting in a 50% decrease in memory space required but also in an increase of computation time since each partition has to be Fourier transformed individually.

Figure 8:
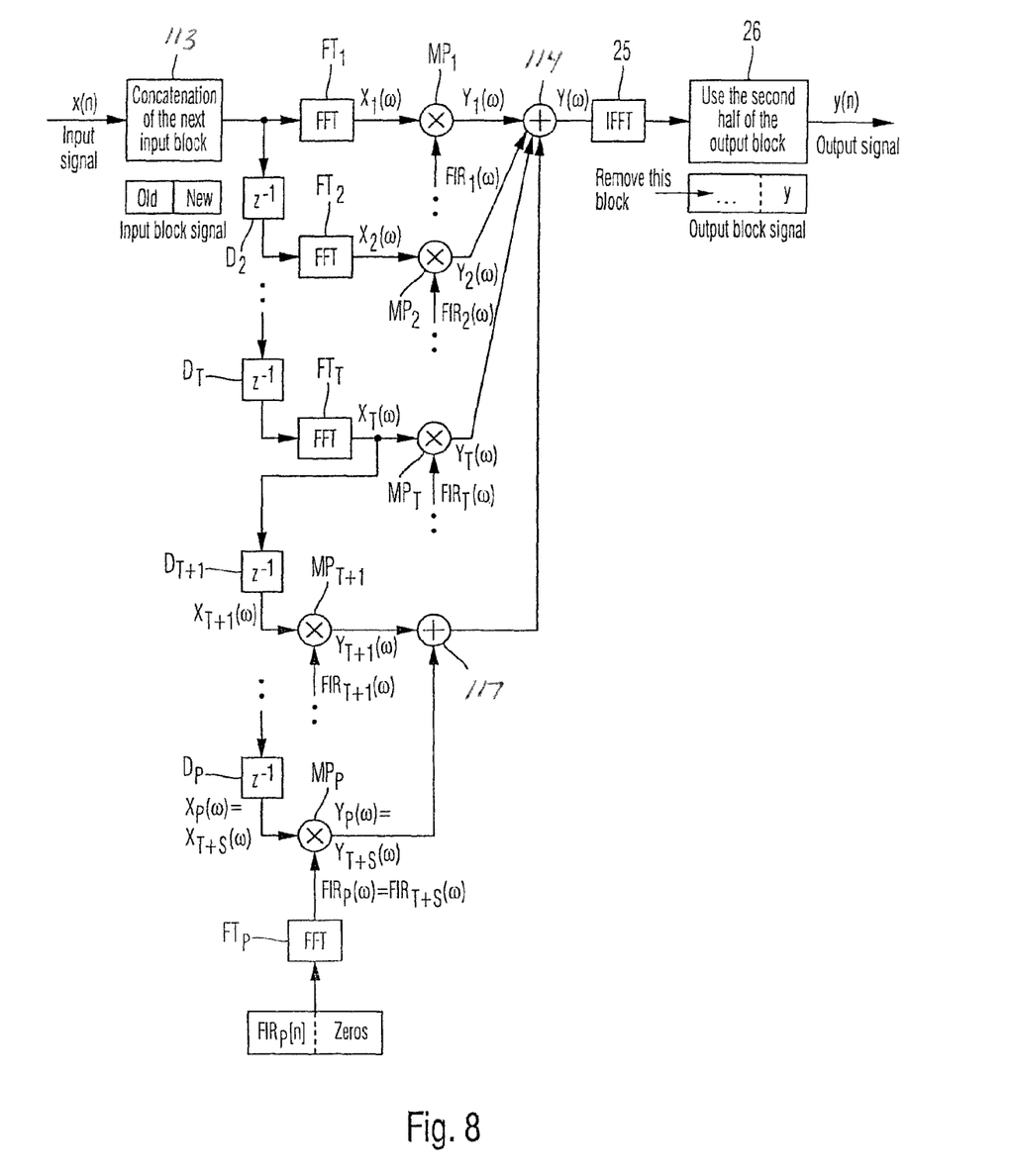
FIG. 8 is a block diagram illustration of a mode of operation of a Generalized Multi Delay Adaptive Filter (GMDF) algorithm with partitioning in the spectral and time domain.

An exemplary AEC system that employs partial partitioning in the time- and frequency domain and where the updating part of the adaptive filter has been omitted in the interest of ease of illustration, is shown in FIG. 8. The output signal of a concatenation 113 for assembling a new input block signal is supplied to a functional block $FT_1$ for Fast Fourier Transformation (FFT) whose output signal $X_1(\Omega)$ is supplied to an adaptive filter which is, for the sake of simplicity, only shown as a multiplier MP1 receiving the signal $X_1(\omega)$ and a signal $FIR_1(\omega)$. The adaptive filter has a structure that is, e.g., such as the one described with reference to FIG. 7 where the multiplier $MP_1$ of FIG. 8 corresponds to multiplier 73 of FIG. 7, signal $X_1(\omega)$ corresponds to signal $X_P(e^{j\Omega},n)$, signal $Y_1(\omega)$ corresponds to signal $D^{\wedge}_P(e^{j\Omega},n)$, and signal $FIR_1(\omega)$ corresponds to signal $W^-_P(e^{j\Omega},n)$. Functional blocks having the same structure as the previously described block may be connected via their inputs to taps of a delay line that is supplied with output signal of the concatenation unit 113 and has delay elements $D_2$, ... $D_T$, $D_{T+1}$, ... $D_P$, each with a transfer function $z^{-1}$ and connected in series to exclusively establish partitions in the spectral domain.

In the present example, however, a mixed structure was chosen such that delay elements $D_2$, ... $D_T$, form a first delay line as a basis for a partitioning in the time domain and delay elements $D_{T+1}$ ... $D_P$, form a second delay line for a partitioning in the spectral domain. Inputs of functional blocks $FT_1$ ... $FT_T$ for Fast Fourier Transformation (FFT) are connected to taps of the first delay line and adaptive filters (represented by multipliers $MP_1$ ... $MP_T$) are connected downstream of the blocks $FT_1$ ... $FT_T$. Block $FT_T$ serves also as the one functional block for Fast Fourier Transformation (FFT) that is connected upstream of the second delay line.

Inputs of adaptive filters (represented by multipliers $MP_{T+1}$ ... $MP_P$) are connected to taps of the second delay line. The output signals $Y_1(\omega)$ ... $Y_P(\omega)$ of all adaptive filters (represented by multipliers $MP_1$ ... $MP_p$) are summed up by adder 114 in connection with adder 117 to form an output signal $Y(\omega)$. The signal $FIR_P(\omega)$ provided to multiplier $MP_P$ is generated by a functional block $FT_P$ for Fast Fourier Transformation (FFT) whose input signal is composed of a data block $Fir_P[n]$ and a data block containing zeros. The output signal $Y(\omega)$ of adder 114 is supplied to an IFFT 115 whose output is supplied to a unit 116 that selects the last half or more generally the last R samples of the output block signal as output signal y[n].

Although various examples to realize the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Such modifications to the inventive concept are intended to be covered by the appended claims.

What is claimed is:

1. A method for acoustic echo cancellation (AEC), comprising:
    transforming an input signal to the frequency domain to provide a frequency domain input signal;
    adaptive filtering the frequency domain input signal to provide an adaptive filtered output signal;
    transforming the input signal and the error signal from the time domain into the spectral domain to provide a frequency domain input signal and a frequency domain error signal;
    delaying the frequency domain input signal to generate multiple differently delayed input signals in the frequency domain;
    filtering each of the multiple differently delayed input signals in the frequency domain according to the frequency domain error signal;
    summing the filtered differently delayed input signals in the frequency domain to generate the approximated output signal in the frequency domain; and
    transforming the approximated output signal from the frequency domain into the time domain,
    where the adaptive filtering comprises applying a sequential constraint algorithm such that a constraint is applied only once for at least one of the delayed input signals in the frequency domain, and where the respective delayed input signal to which the constraint is applied to changes sequentially in the subsequent block.

2. The method of claim 1 where the time domain input signal is a block signal having two blocks, one of which includes the current input signal and the other a past input signal.

3. The method of claim 1 where the output signal in the time domain is a block signal having two blocks, one of which includes the current output signal.

4. The method of claim 1 where the error signal in the time domain is a block signal having two blocks, one of which includes the current error signal and the other is zero.

5. The method of claim 4 where the two blocks each have a certain size and the two sizes are the same.

6. An acoustic echo cancellation (AEC) apparatus, comprising:
    a loudspeaker that receives an input signal and radiates an audio signal indicative thereof in a listening room;
    a microphone that senses sound in the listening room and provides a microphone signal indicative thereof;
    a first time domain to frequency domain transformation that receives the input signal and provides a frequency domain input signal;
    an adaptive filter unit that models the transfer function of the loudspeaker, listening room and microphone, and filters the frequency domain input signal provide an approximated output signal;
    a frequency domain to time domain transform that receives the approximated output signal and provides a time domain approximated output signal;
    a subtractor that subtracts the time domain approximated output signal from the microphone signal to provide an error signal;
    a second time domain to frequency domain transformation that receives the error signal and provides a frequency domain error signal; and
    a filter coefficient unit that processes the frequency domain error signal to adjust tap weights of the adaptive filter,
    where the adaptive filtering includes a sequential constraint algorithm such that a constraint is applied only once for at least one of the delayed input signals in the frequency domain, and where the respective delayed input signal to which the constraint is a lied to changes sequentially in the subsequent block.

7. The apparatus of claim 6 where the input signal in the time domain is a block signal having two blocks, one of which includes the current input signal and the other a past input signal.

8. The apparatus of claim 6 where the output signal in the time domain is a block signal has two blocks, one of which includes the current output signal.

9. The apparatus of claim 6, where the error signal in the time domain is a block signal that has two blocks, one of which includes the current error signal and the other is zero.

10. The apparatus of claim 9, where the two blocks each have a certain size and the two sizes are the same.

* * * * *

UNITED STATES PATENT AND TRADEMARK OFFICE
CERTIFICATE OF CORRECTION

| | | |
|---|---|---|
| PATENT NO. | : 8,712,068 B2 | Page 1 of 1 |
| APPLICATION NO. | : 12/710092 | |
| DATED | : April 29, 2014 | |
| INVENTOR(S) | : Markus Christoph | |

It is certified that error appears in the above-identified patent and that said Letters Patent is hereby corrected as shown below:

In the Claims

Column 16
Line 34, please delete "a lied" and insert -- applied --

Signed and Sealed this
Twelfth Day of August, 2014

Michelle K. Lee
*Deputy Director of the United States Patent and Trademark Office*